March 17, 1964    A. KERNICK    3,125,690
STATIC SWITCHING CIRCUITS UTILIZING A HYPERCONDUCTIVE
DEVICE IN A DIODE BRIDGE CIRCUIT
Filed Nov. 21, 1960

WITNESSES:
Leon M. Garman
James F. Young

INVENTOR
Andress Kernick
BY
Ernest P. Klipfel
ATTORNEY

United States Patent Office 3,125,690
Patented Mar. 17, 1964

3,125,690
STATIC SWITCHING CIRCUITS UTILIZING A HYPERCONDUCTIVE DEVICE IN A DIODE BRIDGE CIRCUIT
Andress Kernick, Lima, Ohio, assignor to Westinghouse Electric Corporation, East Pittsburgh, Pa., a corporation of Pennsylvania
Filed Nov. 21, 1960, Ser. No. 70,551
3 Claims. (Cl. 307—88.5)

The present invention relates generally to static swtching circuits and more particularly relates to a switching circuit utilizing a single static switching device for controlling power to either an alternating current load or a direct current load, or both simultaneously in series.

Accordingly, an object of the present invention is to provide a switching circuit readily connectable for either alternating current or direct current load operation, or both simultaneously in series.

Another object of the present invention is to provide an improved switching circuit adaptable for use with an input signal of steady direct current, full wave alternating current, full wave direct current, or half wave direct current of proper phase.

Another object of the present invention is to provide a switching circuit having power circuit isolation provided by the control means.

Another object of the present invention is to provide an improved switching circuit having protection against false operation due to excessive line voltage or spurious signals.

Another object of the present invention is to provide an improved switching circuit greatly increasing the utilization of the continuous duty capacity of a single static switching device.

Further objects and advantages of the present invention will be readily apparent from the following detailed description taken in conjunction with the drawing, in which.

Figure 1:
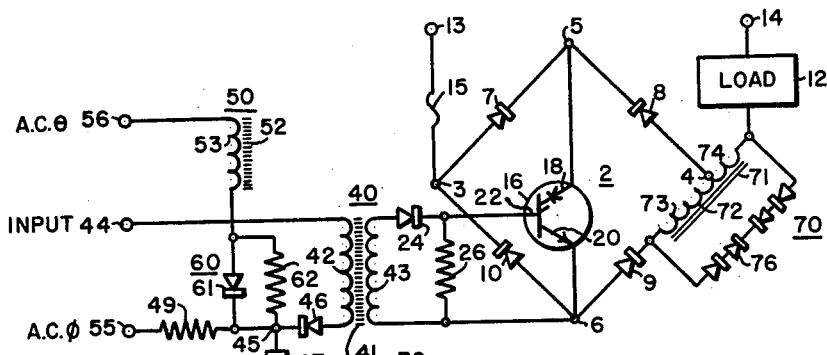
FIGURE 1 is an electrical schematic diagram of an illustrative embodiment of the present invention.

Use of a single static switching device to control power to an alternating current load is illustrated in FIGURE 1 wherein a rectifier bridge 2 is shown having four legs and having terminals indicated as input terminals 3, 4 and output terminals 5, 6. Each leg of the bridge 2 is provided with a rectifier 7, 8, 9 and 10 respectively. The rectifier bridge 2 is poled to block current in either direction through a load circuit, which is adapted to be connected to an alternating current source by means of the terminals 13, 14.

To allow conduction in the load circuit, a static switching device such as a hyperconductive negative resistance adjustable breakover device 16 is connected across the rectifier bridge 2 at terminals 5, 6. The hyperconductive negative resistance adjustable breakover device 16 is hereinafter referred to as device 16. When device 16 is rendered conductive the load circuit is no longer blocked since current is then allowed through the device 16 from terminal 5 to terminal 6. Thus, when terminal 13 is so positive polarity with respect to terminal 14, current results through a fuse member 15, rectifier 7, device 16, rectifier 9, an inductive element 70, and an alternating current load 12 to terminal 14. When terminal 14 is of positive polarity with respect to terminal 13, current results through the alternating current load member 12, a portion of the inductive element 70, rectifier 8, device 16, rectifier 10, and the fuse element 15 to terminal 13. The function of the inductive element 70 will be more fully described hereinafter.

The hyperconductive negative resistance adjustable breakover device 16 has the characteristic of blocking current flow in one direction thereby simulating a switch in the open position. In other words, if a potential is applied to the device in that direction, referred to as the forward direction, a negligible current will flow even at a substantial voltage. If, however, the forward potential across the device is increased further in magnitude, a characteristic breakover point is reached which is critical and the device will suddenly become hyperconductive, sustaining a high current flow with a very little voltage thereby simulating a switch in the closed position. By applying a small control current to such a device, the hyperconductive breakover point can be adjusted to occur at a lower magnitude of voltage than without the control potential. Any suitable type of device having these characteristics may be utilized.

Figure 2:
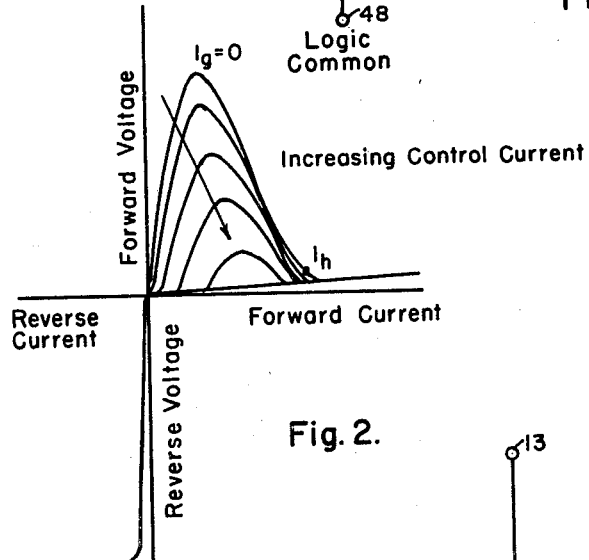
FIG. 2 is a graphical representation illustrating characteristics of the static switching device employed in FIGURE 1.

One suitable type of such a device is described and claimed in a copending application, Serial No. 819,307, filed June 10, 1959, by Frank S. Stein et al. and assigned to the same assignee as the present application. The device therein described in a three terminal semiconductor switching device, either PNPN or NPNP, comprising (1) a wafer of semiconductive material having a first and second region of a first type of semiconductivity (such being either P or N) separated by a region of the second type of semiconductivity, (2) a PN junction between each of the regions of first type of semiconductivity and the region of second type semiconductivity, (3) an emitter disposed upon one surface of one region of the first type semiconductivity, and (4) a PN junction between the emitter and the region of first type semiconductivity. Electrical leads are connected to each of the regions thereof of first type semiconductivity and to the emitter. The device is used in a switching mode in which the switching is controlled by appropriately applying control current to the device. The characteristics of such a breakover device are illustrated in FIGURE 2.

From that figure, it can be seen that by applying a control current $I_g$ of greater magnitude than zero, the forward voltage necessary to cause breakover of the device is reduced from the breakover potential level at zero control current. Its unique breakover characteristic can be applied indefinitely without altering the characteristics of the device.

Once the device has broken over it will continue to allow conduction as long as the current flow anode to cathode exceeds a minimum holding current level $I_h$. Once fired the device 16 will continue conduction even though the gate signal has been removed as long as the keep alive current has not been reduced below the minimum holding current level $I_h$.

Such a hyperconductive negative resistance adjustable breakover device is connected across the rectifier assembly 2 by connecting the anode 18 to terminal 5 and the cathode 20 to terminal 6.

A control circuit 30 connected to the gate 22-cathode 20 circuit of the device 16, is provided for rendering the device 16 conductive. The control circuit 30 is operable to provide to the gate-cathode circuit of the device 16 an input or gate signal only during a selected half cycle, herein designated as the $+\theta$ half wave. Once the control circuit is permitted the half wave mode of operation, the steady direct current, full wave alternating current or direct current signals of proper phasing are acceptable.

The control circuit 30 comprises in general a first saturable reactor 40, a second saturable reactor 50 and associated nonlinear circuit 60.

The saturable reactor 40 comprises a saturable reactor core 41 having inductively disposed thereon an input winding 42 and an output winding 43. A rectifier 24 and a resistive element 26 are connected across the output winding 43 with the gate-cathode circuit of the device 16 connected across the resistive element 26. One end of the input winding 42 is connected to input signal terminal 44 while the other end of the winding 42 is connected to a junction 45 through a rectifier element 46 and hence to a logic common terminal 48 through rectifier 47. A series circuit comprising logic common terminal 48, rectifier 47, junction 45, a resistive element 49 and terminal 55 is adapted to be connected across a power supply of alternating current voltage of the $\phi$ phase. Input signal terminal 44 and logic common terminal 48 are adapted to receive an input signal, for illustrative purposes initially chosen to be of $+\theta$ half wave mode.

The second saturable reactor 50 comprises a saturable reactor core 52 having inductively disposed thereon a winding 53. A series circuit comprising a terminal 56, winding 53, nonlinear circuit 60, junction 45, rectifier 47, and logic common terminal 48 is adapted to be connected across a power supply of alternating current voltage of the $\theta$ phase. The nonlinear circuit 60 comprises rectifier 61 and resistive element 62 connected in parallel circuit relationship with each other and in series circuit relationship with the winding 53 between terminal 56 and junction 45.

It can be seen that rectifier 46 will block any negative going input signal through the primary winding 42. The power supply of alternating current voltage of the $\phi$ phase will block any direct current input signal on each $\phi$ half cycle, and also block any $+\phi$ input signal at rectifier 46 in the same manner. The power supply of alternating current voltage of the $\theta$ phase will block a DC input signal or $+\theta$ signal in the same manner but for the presence of the second saturable reactor 50 as will be further described hereinafter. It can be seen that the $+\theta$ half wave signal is all that results to the saturable reactor 40 and this could be blocked by the $\theta$ alternating current signal across the terminal 56 and 48. However, with the saturable reactor 50 connected in the series circuit across the terminal 56 and 48 the power supply of alternating current voltage of the $\theta$ phase is retarded or chopped by the saturable reactor 50 before appearing at junction 45 to block the positive $\theta$ half wave input signal to the primary winding 42. Therefore, the first portion of the $+\theta$ half wave input signal is allowed through the saturable reactor 40 while the second portion is blocked; the portions being determined by the firing angle of the saturable reactor 50.

With the rectifier 46 in series circuit relationship with the saturable reactor 40 it can be seen that the reactor 40 must operate as a pulse transformer from its positive residual flux density ($+B_R$) to positive saturation flux density ($+B_M$). Therefore, its core 41 is selected to have a low ratio of residual flux density to saturation flux density and have a narrow loop characteristic with core saturation readily achieved. The turns ratio of the saturable reactor 40 is selected to match impedances and at the same time isolate the control circuit from the power circuit. Accordingly, a sizable portion of the $+\theta$ half wave input signal is transformed to the gate-cathode circuit of the device 16 before the saturable reactor 50 fires and inhibits further signal. Saturable reactors 40 and 50 need only be wound to support but half of the volt seconds of a normal input signal. The saturable reactor 40 must support the initial portion of the $+\theta$ half wave input signal between $+B_R$ to $+B_M$; however saturable reactor 50 is permitted to do this between negative residual flux density ($-B_R$) and $+B_M$. A suitable material for the saturable reactor 40 is one which exhibits a $B_R$ to $B_M$ ratio of less than 0.30 and where saturation is achieved in approximately 0.5 oersted. A suitable material for saturable reactor 50 is one having a ratio of $0.800 > B_R/B_M < 0.900$ with $H_c$ less than 0.15 oersted. The reason for the material choice of the saturable reactor 50 is to complete $\theta$ half cycle inhibit and actually inhibit into the $\theta$ half cycle a small amount by means of the $B_M$ to $B_R$ fall-back induced of the saturable reactor 50. Hence, the saturable reactor 50 is not particularly square in hysteresis loop. The usual static switching device, employing magnetic amplifiers having cores of better than 0.92 $B_R/B_M$, produces a smaller fall-back induced voltage that is blocked at rectifier 46 by the larger fall-back induced voltage of saturable reactor 50 so that saturable reactor 40 is properly inhibited. During the remainder of the $\phi$ half cycle, the inhibit is completed by the source of alternating current voltage of the $\phi$ phase through resistive element 49.

During $\theta$ half cycles of input signal, the negative going power supply of alternating current voltage of the $\phi$ phase through resistive element 49 opens the nonlinear rectifier element 47 to the $\theta$ signal. The positive going power supply of alternating current voltage of the $\theta$ phase in conjunction with the negative going power supply of alternating current voltage of the $\theta$ phase will reset the saturable reactor 50 through resistor 62.

Since inhibit unloads the $\theta$ input signal which then goes to full, no load magnitude, resistance drop of winding 53 must be compensated. Rectifying element 46, selected to have a larger forward drop compared with the forward drop of the rectifier 61, accomplishes the desired compensation. Such nonlinear compensation is generally assured by selecting a single cell rectifier element 61 and a multiple cell rectifier element 46.

Since the gate electrode 22 is limited in the magnitude of voltage it can withstand, the resistor 26 is added to assure that the leakage of rectifier 24 will not impress excessive negative voltage on the gate. Since the forward current-voltage curve of the gate electrode 22 obeys the usual diode forward characteristic, the inherent regulation within the saturable reactor 40 will preclude any excessive positive current peak being reached on the gate electrode 22.

The saturable reactor 50 is selected to limit the gate dissipation and to provide a longer reset time for the saturable reactor 40 during direct current input signals. The saturable reactor 50 is present so that if the line voltage has a spurious signal, which may readily occur in static logic elements of the magnetic core type, at the latter part of the half cycle, the saturable reactor 50 will block out the spurious signal since the reactor 50 is selected to saturate after 90° by choice. The saturable reactor 50 is selected to have a firing angle slightly greater than 90° to overcome the most severe case, namely, when the load 12 is purely inductive. When the supply voltage is at 10% above normal, the saturable reactor 50 should have a firing angle of 90° voltage-time integral.

The result is that with the winding 53 of saturable reactor 50 jumpered, the gate-cathode circuit of the device 16 would receive no input signal at all. But with winding 53 in the circuit and by firing the saturable reactor 50 at a selected angle, an input pulse of gate current to the gate-cathode circuit would result during the transformation of the input signal across the saturable reactor 40, which operates as a pulse transformer between $+B_R$ to $+B_M$ with the remainder of the $+\theta$ half wave input signal being blocked by the power supply of an alternating current source of the $\theta$ phase once the saturable reactor 50 has fired.

Without an input signal being present, whenever terminal 3 or 4 is positive and the other terminal is negative, there is no current through the load circuit because the rectifier bridge 2 will at all times block current between terminal 3 and terminal 4. The only remaining path is across the terminals 5 and 6. However, the device 16 through its anode-cathode circuit is connected across the load terminals 5, 6. No matter which input terminal 3 or 4 is positive or negative no current through the load circuit will result as long as the breakover voltage of the device 16 is larger than the forward voltage applied across it from the power terminals 13, 14. Hence, the breakover device is nonconductive allowing no current to pass between the terminals 5, 6.

As previously discussed an input signal to the device 16 occurs only during the first portion of the $+\theta$ half cycle. It can be seen that upon removal of the input signal the device 16 will once again become nonconductive as the current from the anode to cathode becomes less than the minimum holding current level $I_h$. To provide conduction through a full cycle of the alternating current power supply connected to the terminals 13 and 14 the present invention provides an inductive element 70 in the form of a choke having a core 71 and a winding 72 inductively disposed thereon. One end of the inductive element 70 is connected directly to the alternating current load 12 while the opposite end is connected directly to one end of the rectifier 9 in a leg of the rectifier bridge 2. The winding 72 is tapped so that a first portion 73 of the winding 72 is connected within the rectifier bridge 2, namely in series circuit relationship with the rectifier element 9 in one leg of the rectifier bridge 2. A second portion 74 is located external to the rectifier bridge 2 and serially connected with the alternating current load 12. A surge protective selenium diode 76 is inserted to protect the rectifier 8 from possible damage resulting from switching surges of the power supply source connected across the terminals 13, 14.

The choke or inductive element 70 stores energy to tie the $\theta$ half cycles of output to the $\phi$ half cycles of output from the alternating current power source connected to the terminals 13 and 14 for complete full wave cycle of current for each $\theta$ initiating pulse on the gate element 22. The choke is a current feedback element that permits half wave mode of operation in the control circuit 30 particularly to half wave static control system signals. The inductive element 70 stores energy during the $\theta$ half cycle and discharges energy upon the voltage thereacross being reduced below the charged level so that it discharges through the device 22 maintaining the current therethrough to a sufficient magnitude to maintain the device in its conducting state until the $\phi$ half cycle of the alternating current power source has risen sufficiently to exceed the minimum holding current level.

Operation of the choke would cause permanently fired operation of the device 16 except that the second portion 74 of the inductive element carries load current during the $\phi$ half cycle. Once initiated by the inductive element, the load current reverses and thereby neutralizes the flux established by the entire choke during the $\theta$ half cycle to current output.

Accordingly, it can be seen that complete full wave control of the alternating current power source is obtained during each $+\theta$ half wave initiating pulse at the gate element 22 of the device 16.

Figure 3:
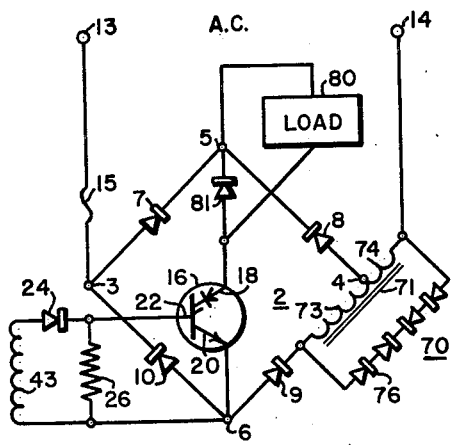
FIG. 3 is an electrical schematic diagram of another embodiment of the present invention.

FIGURE 3 illustrates an alternate embodiment of the teachings of the present invention in which like components of FIGURE 1 have been given the same reference characters. The main distinction between the apparatus illustrated in FIGURES 1 and 3 is that in FIGURE 3 the direct current load 80 and a shunt connected commutating diode 81 has been serially connected with the device 16 across the output terminals, 5, 6.

Upon the device 16 being rendered conductive in a manner previously described with reference to FIGURE 1 and when the terminal 13 is of a positive polarity with respect to terminal 14, current results through the fuse member 15, rectifier 7, direct current load 80, device 16, rectifier 9, the inductive element 70, and the terminal 14. When terminal 14 is of positive polarity with respect to terminal 13, current results through a portion 74 of the inductive element 70, rectifier 8, direct current load 80, device 16, rectifier 10 and fuse element 15 to the terminal 13.

It is readily apparent that the present invention maintains conduction on the gate electrode 22 for just the necessary one-quarter cycle to assure general application of the switch to its load of 100% to zero power factor lagging applications. Fullest power conduction is obtained while minimizing gate electrode power dissipation. Since the inductive element or choke 70 holds in the slave half cycle ($\theta$ half cycle) through the power circuit, the initiating pulse, herein referred to as the $+\theta$ half wave input signal, is applied to the gate electrode 22 only once per cycle and that is all that is necessary. A further advantage obtained by the inductive element 70 is that its presence as a current limiting reactor permits safe application of glass cartridge fuses such as indicated at 15 on a switching circuit that might be applied to an infinite bus. Full wave conduction of the device 16 is obtained utilizing its capacity to a much greater extent than half wave circuits of the conventional or previous art. It is also readily apparent that a static switching circuit has been provided for either a direct current load or an alternating current load, or both simultaneously in series, requiring only a single static switching device. Yet the static switching circuit is readily adaptable to logic function magnetic amplifier circuits in that it is responsive only to a selected half cycle of input, namely the $+\theta$ half cycle input signal as previously discussed. It is to be understood that the selected half cycle of input signal may be the $\phi$ half cycle upon appropriate alterations in the polarities and phases of the connected power supplies. Self-biasing off eliminates the need of a bias supply. Power circuit isolation is provided by the control circuit.

While the present invention has been described with a particular degree of exactness for the purpose of illustration, it is to be understood that all equivalents, alterations, and modifications within the spirit and scope of the invention are herein meant to be included.

I claim as my invention:

1. In combination, a load circuit adapted to be connected to a single phase power source; rectifier means for blocking current in either direction through said load circuit; a hyperconductive negative resistance adjustable breakover device connected across the rectifier means to permit current in either direction through said load circuit when the device is conductive; the breakover voltage of said device being greater than the magnitude of potential across the device from the power source; means for receiving a selected half wave input signal during one half cycle of said power supply; first saturable reactor means for pulsing said device during a portion of said half wave input to a breakover voltage level less than said magnitude of potential, and second saturable reactor means for blocking the remaining portion of said half wave input as determined by a present firing angle chosen to block spurious signals to said first saturable reactor means; said device having a minimum holding current level necessary to sustain conduction through said device; and energy storage means for storing energy during said half cycle and discharging thereafter to exceed said minimum holding current level through said device for a desired time length.

2. In combination, a load circuit adapted to be connected to an alternating current power source; rectifier means for blocking current through said load circuit; a hyperconductive negative resistance adjustable breakover device connected across the rectifier means to permit current through said load circuit when the device is conductive; the breakover voltage of said device being greater than the magnitude of potential across the device from the power supply; circuit means for providing a pulse to said device during one half cycle of said power supply for reducing the breakover voltage level of the device below said magnitude of potential across the device from the power source; said device having a minimum holding current level necessary to sustain conduction through said device; inductive means having a first portion and a second portion operably connected so that said first portion carries load current during said one half cycle and said second portion carries load current during said one half cycle and the other half cycle of the power supply; said first portion storing energy during said one half cycle and discharging the energy through said device to maintain said device in its conducting state at least until the current of the other half cycle exceeds said holding current level; said second portion during said other half cycle neutralizing the flux established by the first portion during said one half cycle.

3. In combination, a load circuit adapted to be connected to an alternating current power source; a rectifier bridge operably connected to block current through said load circuit; a hyperconductive negative resistance adjustable breakover device connected across said rectifier bridge to permit current through said load circuit when the device is conductive; the breakover voltage of said device being greater than the magnitude of potential across the device from the power source; control means providing a control pulse to said device during one half cycle of said power supply for reducing the breakover voltage level of a device below said magnitude of potential across the device from the power source; said device having a minimum holding current level necessary to sustain conduction through said device; choke means including a core and a first winding and a second winding inductively disposed thereon; said first and second windings storing energy therein during said one half cycle and discharging the energy through said device to maintain said device in its conducting state at least until the current of the other half cycle exceeds said holding current level; one leg of said rectifier bridge including said first winding, said second winding serially connected with said power supply; said second winding carrying load current during the other half cycle thereby neutralizing the flux established by the first winding and the second winding during said one half cycle.

References Cited in the file of this patent

UNITED STATES PATENTS 2,965,771    Finkel _____ Dec. 20, 1960

OTHER REFERENCES

Solid State Products Inc., Bulletin D420–02, August 1959, "A Survey of Some Circuit Applications of the Silicon Control Switch and Silicon Controlled Rectifier," pages 7–10.